(12) United States Patent
Mohan et al.

(10) Patent No.: US 8,308,462 B2
(45) Date of Patent: Nov. 13, 2012

(54) PUMP ASSEMBLY WITH RADIAL CLUTCH FOR USE IN POWER TRANSMISSION ASSEMBLIES

(75) Inventors: Sankar K. Mohan, Jamesville, NY (US); Timothy M. Burns, Elbridge, NY (US); Jeremy M. Klyde, Watermill, NY (US)

(73) Assignee: MAGNA Powertrain USA, Inc., Troy, MI (US)

( * ) Notice: Subject to any disclaimer, the term of this patent is extended or adjusted under 35 U.S.C. 154(b) by 789 days.

(21) Appl. No.: 12/499,846

(22) Filed: Jul. 9, 2009

(65) Prior Publication Data

US 2010/0065392 A1     Mar. 18, 2010

Related U.S. Application Data

(60) Provisional application No. 61/079,244, filed on Jul. 9, 2008.

(51) Int. Cl.
*F01C 21/00* (2006.01)
*F04C 15/00* (2006.01)
*F16D 7/02* (2006.01)

(52) U.S. Cl. ............... 418/69; 484/41; 192/56.1
(58) Field of Classification Search ............ 418/69; 464/41; 192/56.1, 107 T, 79, 104 C
See application file for complete search history.

(56) References Cited

U.S. PATENT DOCUMENTS

| | | | |
|---|---|---|---|
| 1,999,364 A | 4/1935 | Lang | |
| 2,700,341 A * | 1/1955 | Smirl | 418/25 |
| 2,758,689 A | 8/1956 | Spase | |
| 2,855,080 A | 10/1958 | Spase | |
| 3,455,422 A * | 7/1969 | Spar et al. | 418/69 |
| 5,000,721 A | 3/1991 | Williams | |
| 5,752,810 A | 5/1998 | Hein | |
| 5,971,880 A | 10/1999 | Keiser | |
| 6,017,202 A | 1/2000 | Durnack et al. | |
| 6,398,531 B1 | 6/2002 | Andres et al. | |
| 6,508,140 B2 * | 1/2003 | Zaps | 74/411 |
| 6,544,019 B2 | 4/2003 | Martin et al. | |
| 6,634,866 B2 | 10/2003 | Vukovich et al. | |
| 7,445,438 B2 | 11/2008 | Ronk et al. | |
| 7,914,269 B2 * | 3/2011 | Grethel et al. | 418/69 |
| 2005/0249622 A1 | 11/2005 | Sefcik | |
| 2006/0222552 A1 | 10/2006 | Ronk et al. | |
| 2007/0056822 A1 | 3/2007 | Porter et al. | |
| 2008/0014107 A1 | 1/2008 | Grethel et al. | |

FOREIGN PATENT DOCUMENTS

| | | |
|---|---|---|
| DE | 202006000110 U1 | 4/2006 |
| DE | 102006027317 A1 | 12/2007 |
| EP | 1195536 A | 4/2002 |
| JP | 2002039270 A * | 2/2002 |

* cited by examiner

*Primary Examiner* — Mary A Davis

(74) *Attorney, Agent, or Firm* — Harness, Dickey & Pierce, P.L.C.

(57) ABSTRACT

A power transmission device includes a rotatable shaft having an axis of rotation. A lubrication pump includes an inner rotor and an outer rotor in meshed engagement with one another. A clutch continuously drivingly couples one of the inner rotor and the outer rotor and the shaft to limit the power transferred from the shaft to the lubrication pump. The clutch includes a plurality of circumferentially spaced-apart protrusions biasedly engaged with the shaft.

21 Claims, 9 Drawing Sheets

PUMP ASSEMBLY WITH RADIAL CLUTCH FOR USE IN POWER TRANSMISSION ASSEMBLIES

CROSS-REFERENCE TO RELATED APPLICATIONS

This application claims the benefit of U.S. Provisional Application No. 61/079,244, filed on Jul. 9, 2008. The entire disclosure of the above application is incorporated herein by reference.

BACKGROUND

The present disclosure relates to a pump and clutch assembly for use in a power transmission assembly. More particularly, a driven pump component of a fluid pump is coupled to a rotary drive member of the power transmission assembly by a radial friction clutch that is operable to limit the power consumed by the fluid pump.

Power transmission devices such as motor vehicle automatic transmissions, transfer cases and drive axles are often equipped with rotating shafts, bearings and/or gear sets contained within suitable housings. To achieve a desired operation of the various mechanical power transmitting components, it may be desirable to provide a lubricating fluid flow within the housing.

At least one known transfer case utilizes a fluid pump driven by a rotatable input member to draw lubricating fluid from a low-pressure sump and output pressurized fluid to another location within the housing. Pressurized lubricating fluid may be directed to one or more of the mechanical interfaces between the various components. Alternatively, pressurized fluid may be directed to a portion of the housing furthest from the ground to allow gravity to assist in disbursing the lubricating fluid.

While the prior designs may have achieved the primary goal of providing fluid flow, improvements may be made. For example, current customer specifications require that various power transmission devices pass low-speed abuse tests. To achieve favorable test results, it may be desirable to size the lubrication system to provide a predetermined minimum volume flow rate of lubricating fluid at a low operating speed. It should be noted, however, that current pump designs provide increased flow as the operating speed increases. The energy required to operate the pump also increases as the operating speed increases. As such, the pumping losses during vehicle high-speed or highway operation may be significant. Furthermore, lubricating fluid cavitation may also exist at the high pump rotational speeds.

Accordingly, there may be a need to limit the power provided to a lubrication pump during high-speed power transmission device operation.

SUMMARY

A power transmission device includes a rotatable shaft having an axis of rotation. A lubrication pump includes an inner rotor and an outer rotor in meshed engagement with one another. A clutch continuously drivingly couples one of the inner rotor and the outer rotor to the shaft and functions to limit the power transferred from the shaft to the lubrication pump. The clutch includes a plurality of circumferentially spaced-apart protrusions biasedly engaged with the shaft.

Additionally, a lubrication pump and clutch assembly for a power transmission device includes a lubrication pump having an inner rotor and an outer rotor in meshed engagement with one another. A clutch is adapted to drivingly interconnect one of the inner and outer rotors with a rotatable member of the power transmission device. The clutch includes a plurality of circumferentially spaced-apart protrusions adapted to biasedly engage the rotatable member of the power transmission device for limiting the power transferred to the lubrication pump.

A lubrication pump and clutch assembly for a power transmission device includes a drive gear adapted to be driven by a rotatable member of the power transmission device. A lubrication pump has a pump housing and a rotary member. The drive gear is rotatably positioned within the pump housing and drivingly engages the rotary member of the lubrication pump to cause a pressurized fluid flow. A clutch includes a plurality of flexible members coupled to the drive gear and adapted to biasedly engage the rotatable member of the power transmission device to transfer up to a predetermined maximum torque to the lubrication pump.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

In general, the present disclosure relates to a clutch and lubrication pump assembly positioned within a housing of a power transmission device of a motor vehicle. The clutch is a radial friction clutch associated with one of the rotating shafts of the power transmission device. The clutch secures a drive member of the lubrication pump for rotation with the rotating shaft during low-speed operation of the power transmission device. At higher operating speeds, the clutch slips to limit the power consumed by the lubrication pump.

Figure 1:
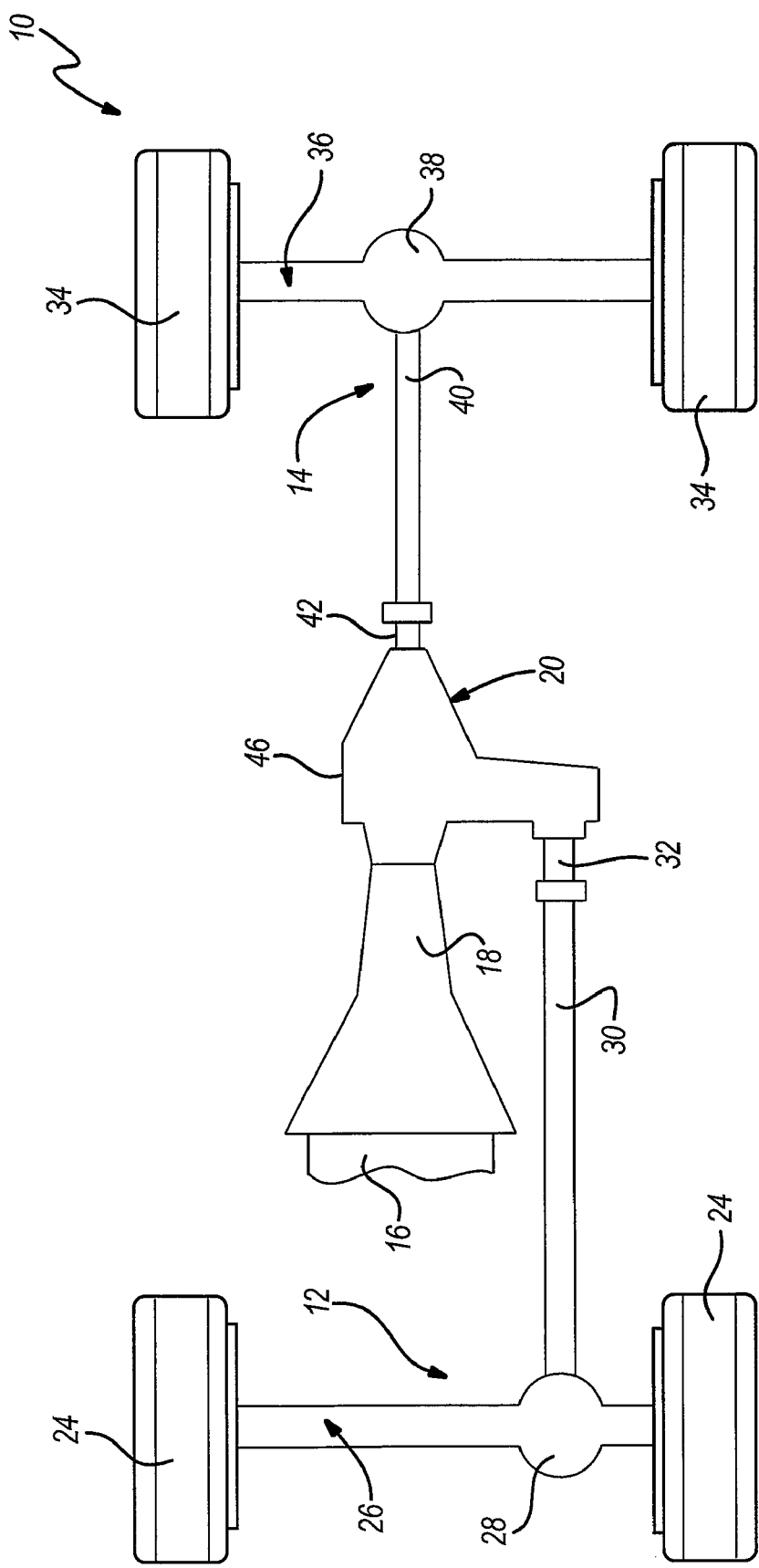
FIG. 1 is a schematic representation of an exemplary vehicle equipped with the power transmission device of the present disclosure.

With particular reference to FIG. 1 of the drawings, a drivetrain 10 for a four-wheel drive vehicle is shown. Drivetrain 10 includes a front driveline 12 and a rear driveline 14 both drivable from a source of power, such as an engine 16, through a transmission 18 which may be of either the manual or automatic type. In the particular embodiment shown, drivetrain 10 is a four-wheel drive system which incorporates a power transmission device 20 for transmitting drive torque from engine 16 and transmission 18 to front driveline 12 and rear driveline 14. Front driveline 12 is shown to include a pair of front wheels 24 connected at opposite ends of a front axle assembly 26 having a front differential 28 that is coupled to one end of a front propshaft 30, the opposite end of which is coupled to a second or front output shaft 32 of power transmission device 20. Similarly, rear driveline 14 includes a pair of rear wheels 34 connected at opposite ends of a rear axle assembly 36 having a rear differential 38 coupled to one end of a rear propshaft 40, the opposite end of which is interconnected to a first or rear output shaft 42 of power transmission device 20.

Figure 2:
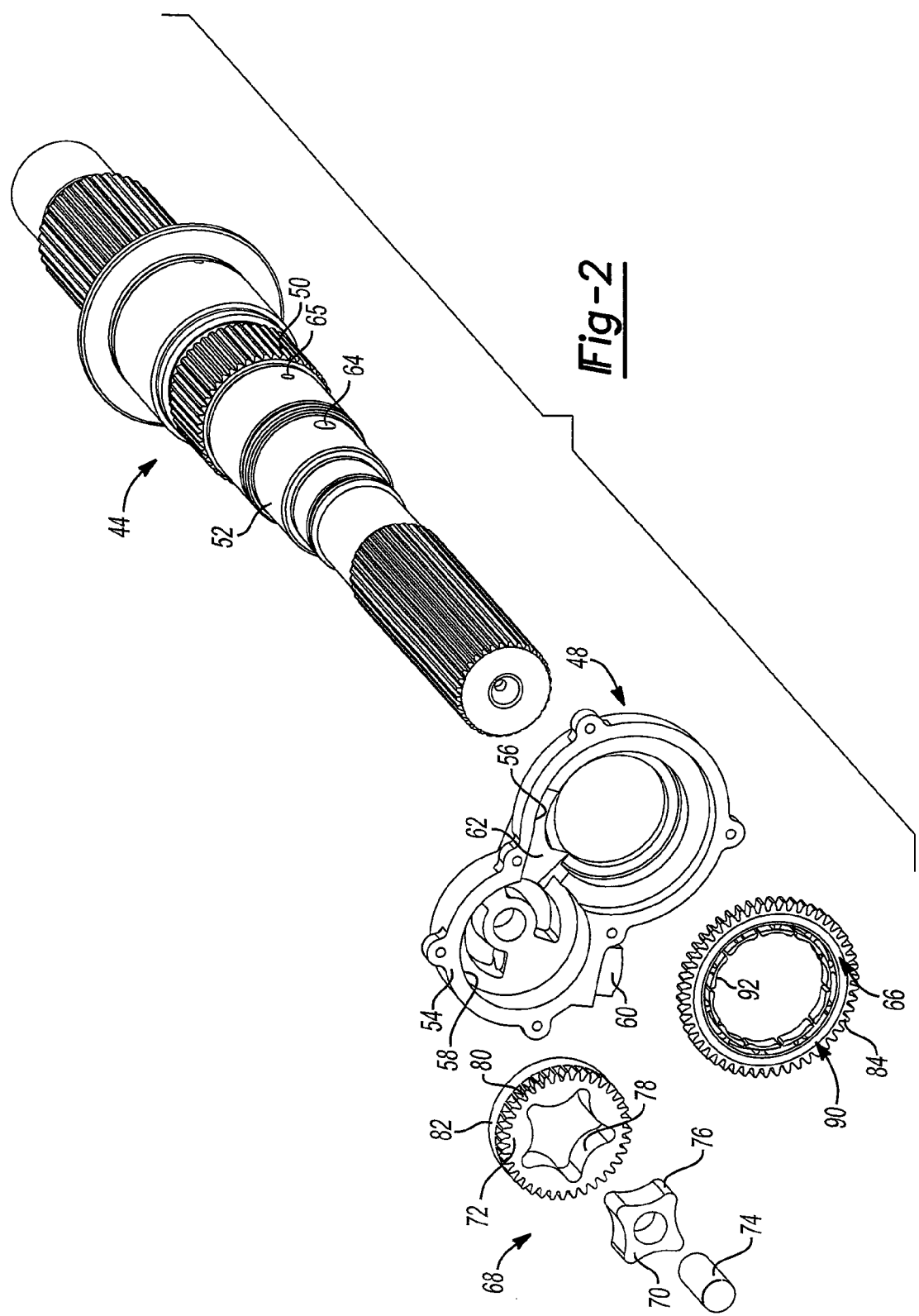
FIG. 2 is a fragmentary perspective view of the power transmission device equipped with a clutch and lubrication pump assembly of the present disclosure.
Figure 3:
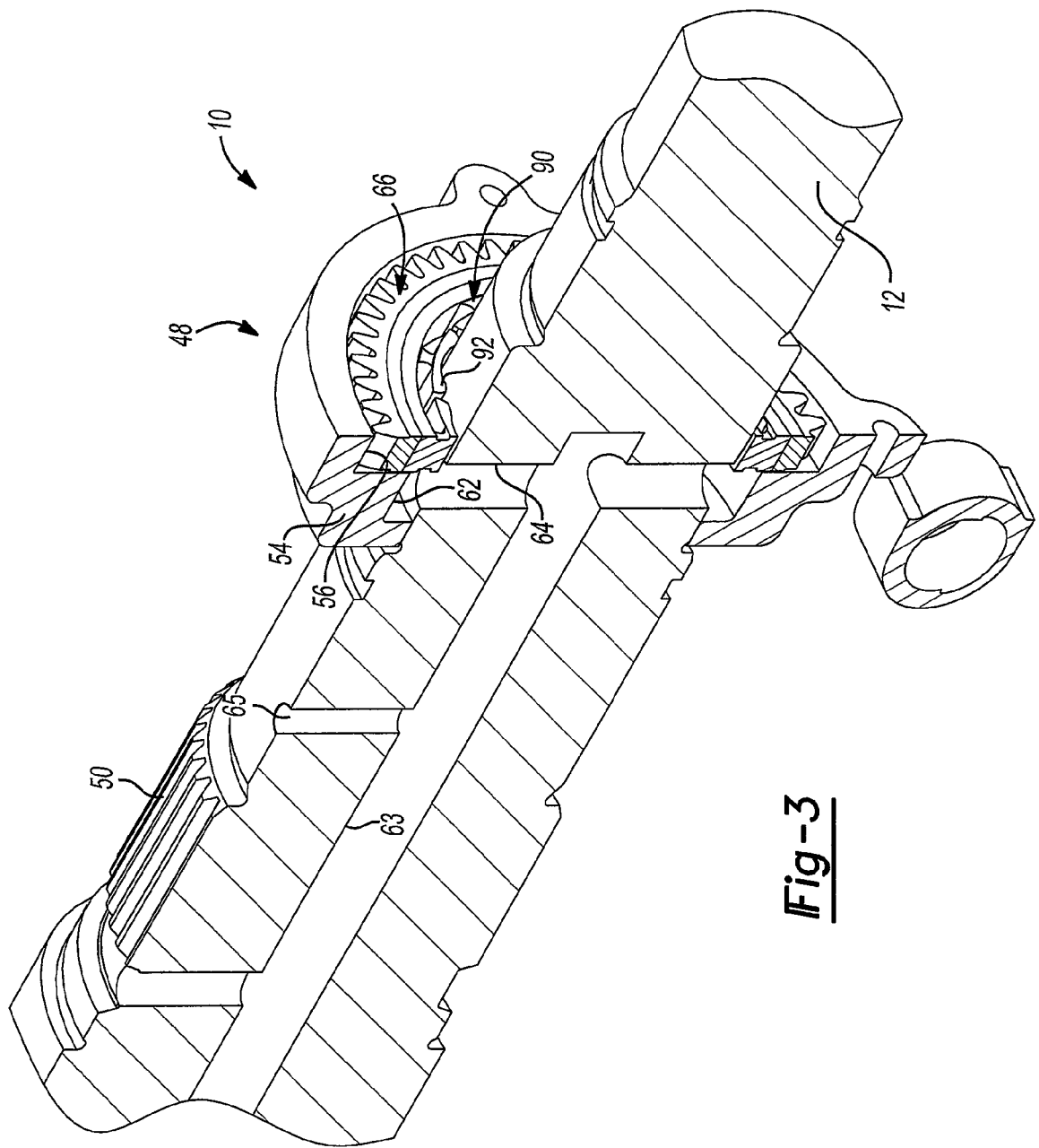
FIG. 3 is a fragmentary cross-sectional perspective view of the clutch and lubrication pump assembly.
Figure 4:
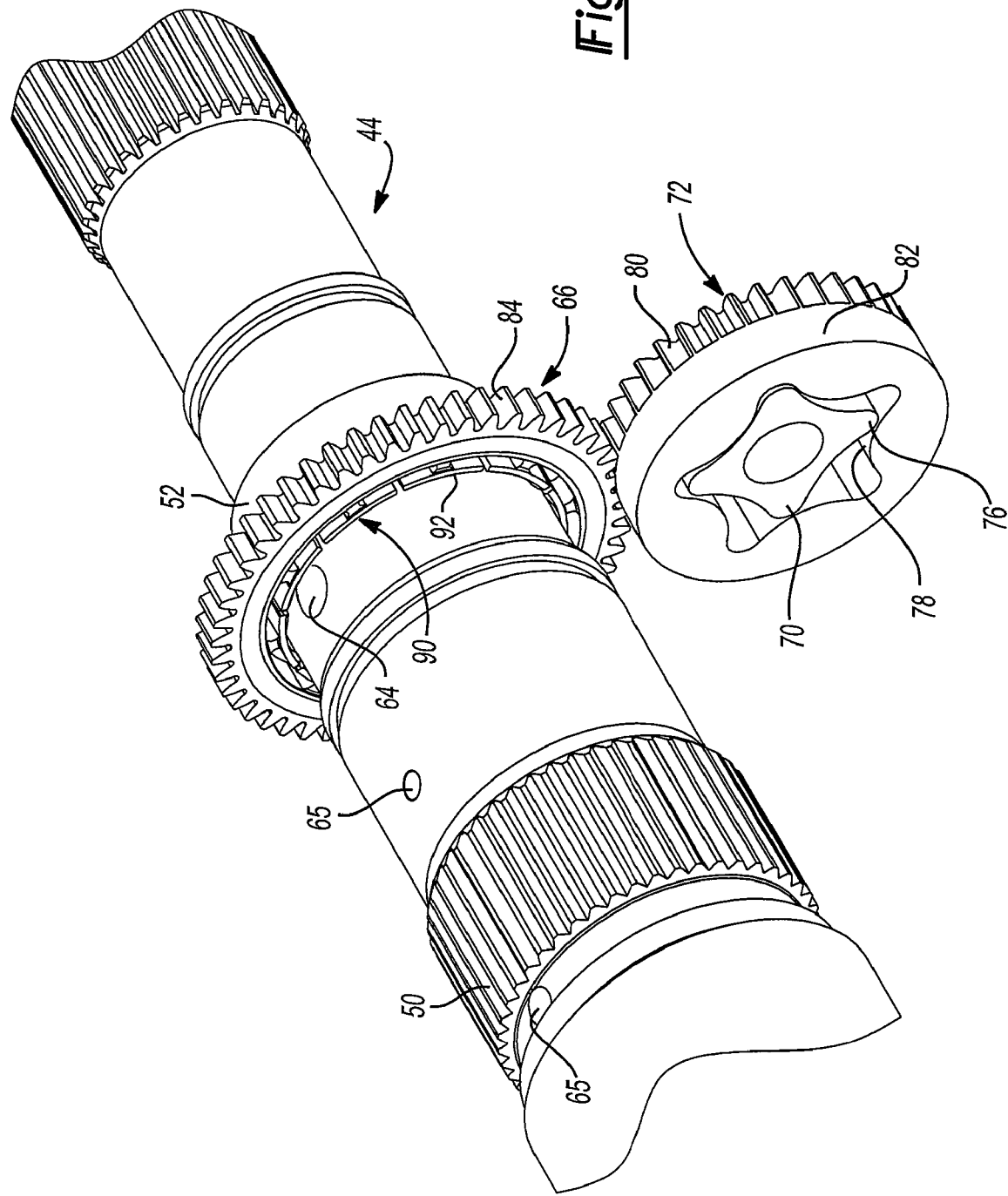
FIG. 4 is a fragmentary perspective view of the clutch and lubrication pump assembly.

With particular reference to FIGS. 2-4 of the drawings, a portion of power transmission device 20 is shown to include an input shaft 44 which is rotatably supported in a housing 46 (FIG. 1). Input shaft 44 is adapted for connection to an output shaft (not shown) of transmission 18 such that both are rotatably driven by engine 16 of the motor vehicle. Likewise, front output shaft 32 and rear output shaft 42 are rotatably supported in housing 46.

A lubrication pump assembly 48 is shown associated with and driven by input shaft 44. Input shaft 44 has a variety of stepped journals, including a splined portion 50 and a relatively smooth, cylindrically-shaped journal 52. Pump assembly 48 includes a pump housing 54 defining a first cavity 56 and a second cavity 58 in communication with one another. An inlet 60 in pump housing 54 is formed in communication with a suction side of pump assembly 48. An outlet 62 is formed in pump housing 54 in communication with a high-pressure discharge side of pump assembly 48. Outlet 62 provides pressurized fluid to a cross-drilled inlet 64 formed in input shaft 44. Inlet 64 communicates with a longitudinally extending passageway 63. A number of outlet ports 65 are formed along input shaft 44 in communication with passageway 63 to distribute lubrication to other areas of the power transmission device.

A drive gear 66 is rotatably positioned within first cavity 56. A gerotor pump 68 is positioned within second cavity 58. Gerotor pump 68 includes an inner rotor 70 and an outer rotor 72 supported for rotation on a pin 74. Inner rotor 70 includes a plurality of external lobes 76 that rotate within a cavity defined by a plurality of inner lobes 78 formed on outer rotor 72. Inner rotor 70 has N lobes, while outer rotor 72 has N+1 lobes. Both inner rotor 70 and outer rotor 72 rotate during pump actuation. As inner rotor 70 and outer rotor 72 rotate, an area between these components increases, creating a vacuum. The vacuum portion of gerotor pump 68 creates suction and is in fluid communication with inlet 60 of pump housing 54. Another portion of the interface between inner rotor 70 and outer rotor 72 is associated with an area of gerotor pump 68 that decreases as inner rotor 70 and outer rotor 72 rotate. The decreasing area between the inner and outer rotors 70, 72 causes compression. Compression increases the pressure acting on the fluid. Pressurized fluid is in communication with outlet 62 formed in pump housing 54.

A plurality of external teeth 80 are formed on outer rotor 72 such that gerotor pump 68 may be externally driven. Outer rotor 72 also includes an enlarged journal portion 82 positioned adjacent to teeth 80. Journal portion 82 is formed concentric with and slightly larger than an outer diameter defined by teeth 80. Journal portion 82 is rotatably supported in second cavity 58 to maintain the rotational position of outer rotor 72 relative to pump housing 54.

A plurality of external teeth 84 are formed on drive gear 66 and placed in meshed engagement with teeth 80 formed on outer rotor 72. Generally, gerotor pump 68 is a positive displacement pump capable of pumping fluid at a rate proportional to the rotational speed of outer rotor 72. While a gerotor-type pump is shown and described, it should be appreciated that any type of mechanical pump capable of generating pumping action in response to rotation of drive gear 66 may be implemented.

Figure 5:
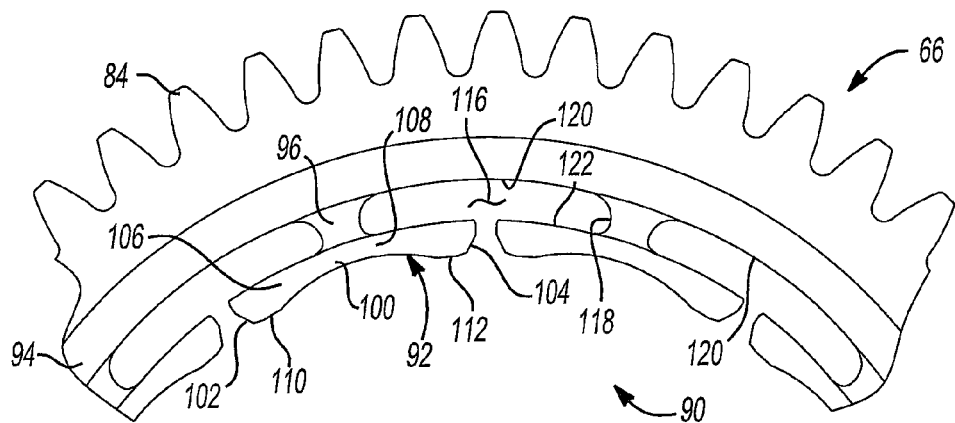
FIG. 5 is an enlarged fragmentary view of the clutch and lubrication pump assembly.

A radial friction clutch 90 drivingly interconnects drive gear 66 and input shaft 44. As best shown in FIG. 5, clutch 90 includes a plurality of circumferentially extending multi-lever beams 92. Each multi-lever beam 92 is coupled to a ring portion 94 of drive gear 66 by a radially extending web 96. Multi-lever beams 92, web 96 and ring portion 94 may be integrally formed with one another or may be constructed from differing materials to obtain the desired clutch performance characteristics. For example, it is contemplated that an integral drive gear, multi-lever beam clutch be injected molded from a Dupont Zytel® material. Zytel® HTNWRF5I30 may provide desirable friction and wear characteristics at the load and temperature environment within power transmission device 20.

Clutch 90 functions to limit the torque transferred from input shaft 44 to drive gear 66. Clutch 90 is configured such that multi-lever beams 92 of drive gear 66 frictionally engage journal 52 on input shaft 44. As such, drive gear 66 rotates at the same speed as input shaft 44 until the resistance to rotation of drive gear 66 provided by gerotor pump 68 exceeds the torque generated by clutch 90. Accordingly, clutch 90 fixes drive gear 66 for rotation with input shaft 44 at relatively low operating speeds where the torque input required for pumping is relatively low.

As the rotational speed of input shaft 44 increases, the rotational speeds of inner rotor 70 and outer rotor 72 also increase. Power consumption to drive gerotor pump 68 at the increased speed also increases to provide the increased pump output flow rate. However, an increased pump output flow rate is not necessarily required. To conserve energy, drive gear 66 is permitted to slip relative to input shaft 44 once a predetermined torque magnitude is transferred by clutch 90.

Each multi-lever beam 92 has a center portion 100 supported by web 96, a first unsupported end 102 and a second unsupported end 104. As such, each multi-lever beam 92 includes a pair of cantilever beams, where a first cantilever beam 106 extends from center portion 100 to first end 102 and a second cantilever beam 108 extends from center portion 100 to second end 104. First end 102 of first cantilever beam 106 has a bulbous shape and includes a first contact surface 110. Similarly, second end 104 of second cantilever beam 108 includes a second contact surface 112. First contact surface 110 and second contact surface 112 are arcuately shaped. In the free state, the plurality of contact surfaces 110, 112 associated with multi-lever beams 92 define an inscribed circle having a diameter. The diameter of the inscribed circle is smaller than an outer diameter defined by journal 52.

To assemble drive gear 66 to input shaft 44, each of the first and second cantilever beams 106, 108 are deflected. Each contact surface 110, 112 is placed in biased engagement with journal 52. A normal load is exerted by each cantilever beam 106, 108 through contact surfaces 110, 112 to journal 52. A corresponding friction force is generated, resisting relative rotation between drive gear 66 and input shaft 44. Friction clutch 90 transfers a magnitude of torque corresponding to the normal loads provided by multi-lever beams 92 and the coefficient of friction between contact surfaces 110, 112 and journal 52. Multi-lever beams 92 also allow for relative misalignment between input shaft 44 and drive gear 66. Furthermore, multi-lever beams 92 function to continue to apply a biasing force against journal 52, even as contact surfaces 110, 112 wear over time.

Figure 6:
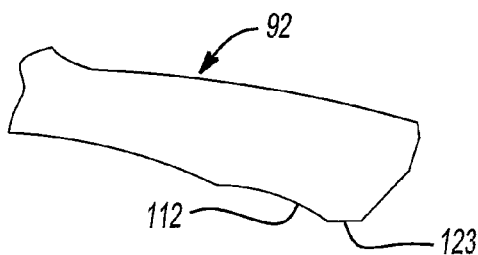
FIG. 6 is fragmentary plan view of a portion of the clutch assembly depicted in FIG. 5.

Referring to FIGS. 5 and 6, it should be appreciated that a plurality of passages 116 are at least partially defined by side walls 118 of web 96, an inner substantially-cylindrical surface 120 of ring portion 94 and outer substantially-cylindrical surfaces 122 of multi-lever beams 92. Passages 116 allow first cantilever beam 106 and second cantilever beam 108 to deflect therein during initial installation of drive gear 66 on input shaft 44, as well as during dynamic operation of pump assembly 48. Passages 116 also provide paths for lubricating fluid to flow and lubricate the interface between contact surfaces 110, 112 and journal 52.

At the time of initial vehicle operation, input shaft 44 and drive gear 66 are not rotating relative to one another. As such, a static coefficient of friction between contact surfaces 110, 112 and journal 52 is a factor defining the magnitude of torque provided by clutch 90. Once relative slipping between multi-lever beams 92 and journal 52 occurs, a dynamic coefficient of friction between contact surfaces 110, 112 and journal 52 applies.

In addition, centripetal force urges contact surfaces 110, 112 away from journal 52 as the rotational speed of drive gear 66 increases. To accentuate this effect, first end 102 and second end 104 may be shaped to include an increased mass more than that shown. Alternatively or in combination, a minimum cross-sectional thickness of first cantilever beam 106 and second cantilever beam 108 may be reduced. The cross-sectional area reduction will be limited based on a maximum allowable stress concentration.

During rotation of drive gear 66, fluid pressurized by gerotor pump 68 is placed in contact with multi-lever beams 92. A chamfer 123 is formed at the distal end of each contact surface 110, 112 to urge fluid to become positioned between contact surfaces 110, 112 and journal 52. A relatively thin film of fluid will form between multi-lever beams 92 and journal 52 depending on the speed of rotation of drive gear 66. Once the thin film separates contact surfaces 110, 112 from journal 52, the torque transferred between these members will decrease. In addition, heat generated at the interface between contact surfaces 110, 112 and journal 52 will be transferred to the fluid and pumped to other areas remote from the frictional interfaces. This dynamic lubrication process functions to reduce clutch wear and operating temperature to increase the longevity of the clutch.

Figure 7:
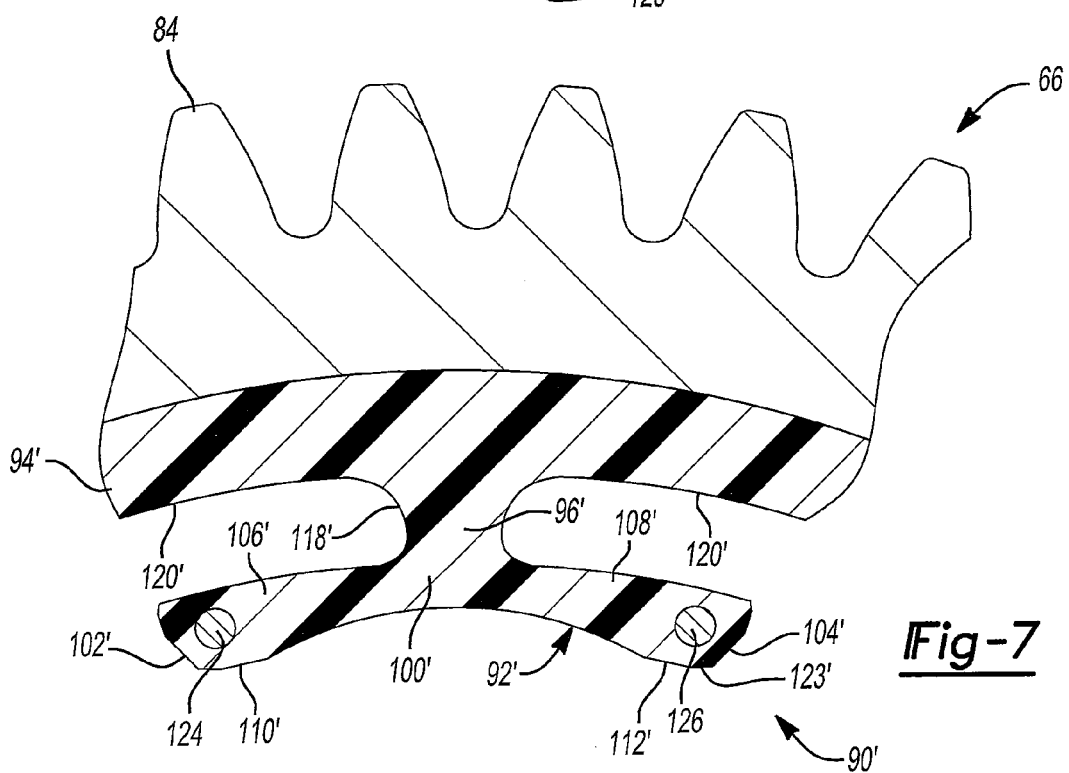
FIG. 7 is an enlarged fragmentary view of a friction clutch and drive gear arrangement.

Another clutch 90' is shown in FIG. 7. Clutch 90' is substantially similar to clutch 90. Accordingly, like elements will retain their previously introduced reference numerals including a prime suffix. Multi-lever beams 92' include first and second metallic inserts 124, 126 attached to ends 102', 104'. It is contemplated that inserts 124, 126 may be overmolded within first cantilever beam 106' and second cantilever beam 108'. It should be appreciated that the aforementioned design criteria may be optimized to assure that drive gear 66 rotates at the same speed as input shaft 44 until a predetermined torque has been transferred. Once the predetermined torque value has been exceed, drive gear 66 slips relative to input shaft 44. Multi-lever beams 92' attempt to maintain a biasing load on journal 52 to assure that drive gear 66 continues to rotate and operate gerotor pump 68. However, drive gear 66 will rotate at a speed less than input shaft 44 to avoid rotating the components of gerotor pump 68 at speeds where undesirable pump losses will be incurred. Other beam designs including non-metallic inserts, similar to metallic inserts 124, 126, are also contemplated.

Figure 8:
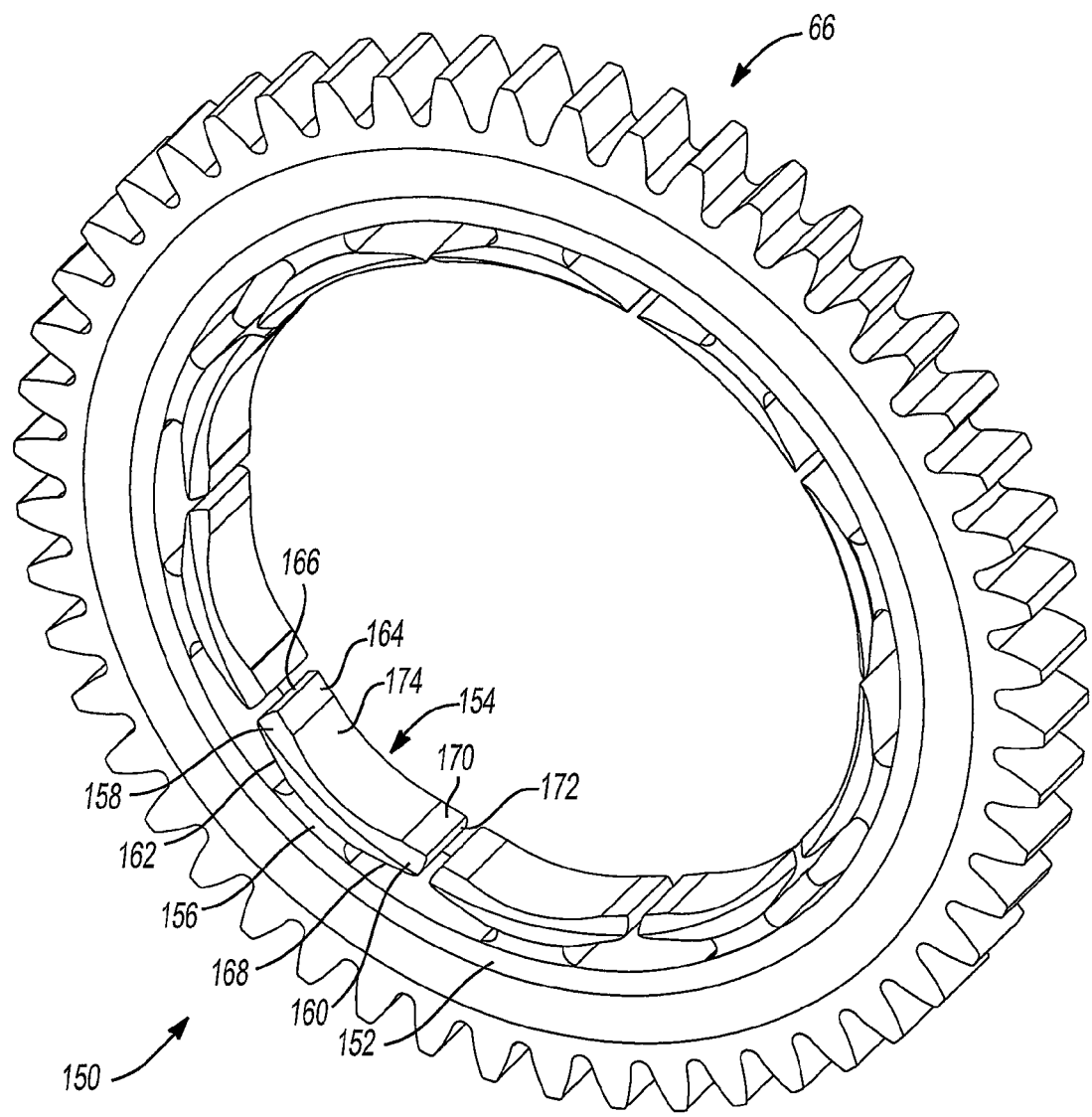
FIG. 8 is a perspective view of another radial friction clutch.

FIG. 8 depicts another radial friction clutch at reference numeral 150. Clutch 150 is substantially similar to clutch 90 previously described. Clutch 150 may be integrally formed with drive gear 66 or simply fixed for rotation thereto. Clutch 150 includes an uninterrupted cylindrically shaped ring 152 having a plurality of radially inwardly extending protrusions 154. Each protrusion 154 is coupled to ring 152 by a web 156. Each protrusion 154 includes a first cantilever beam 158 extending in one direction from web 156 and a second cantilever beam 160 extending in an opposite direction from web 156. First cantilever beam 158 and second cantilever beam 160 are substantially similar to one another and web 156 is substantially centered within protrusion 154. Accordingly, the web and first and second cantilever beam arrangement is a substantially symmetrical arrangement.

First cantilever beam 158 includes a tapered outer surface 162 and a tapered contact surface 164 converging toward a first end 166. Second cantilever beam 160 similarly includes an outer tapered surface 168 and a tapered contact surface 170 converged toward a second end 172. An arcuately-shaped section 174 interconnects first contact surface 164 and second contact surface 170. First contact surface 164 and second contact surface 170 may be substantially planar or arcuately-shaped surfaces arranged to substantially conform to the shape of journal 52 when clutch 150 is installed on input shaft 44. In this manner, bending stresses imparted on first cantilever beam 158 and second cantilever beam 160 may be minimized while the contact surface area between protrusions 154 and journal 52 is optimized.

Figure 9:
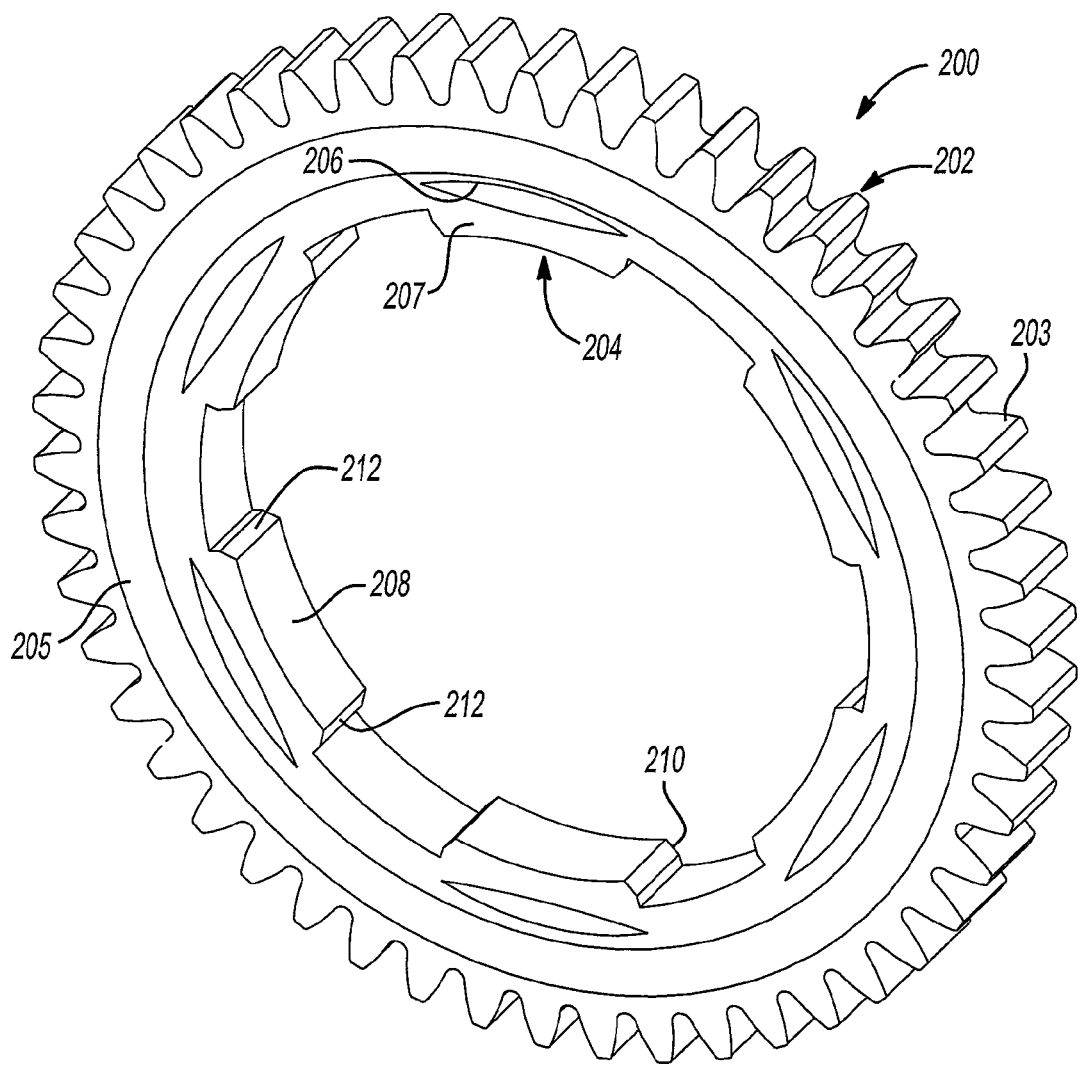
FIG. 9 is a perspective view of another radial friction clutch.

FIG. 9 depicts another radial friction clutch at reference numeral 200. Friction clutch 200 includes a drive gear 202 having a plurality of teeth 203 circumferentially spaced-apart from one another and drivingly engaged with teeth 80 formed on outer rotor 72. Clutch 200 includes a plurality of spaced-apart protrusions 204 radially inwardly extending from a ring 205. A plurality of circumferentially spaced-apart slots 206 extend through ring 205. Each of slots 206 is positioned in alignment with and offset from a distal end of protrusions 204. By proper selection of a material for protrusions 204 as well as the position and size of slots 206, the distal portions of protrusions 204 form elastically-deformable flexible webs 207 each having friction surfaces 208. The plurality of friction surfaces 208 define an inscribed circle having a diameter less than the outer diameter of journal 52. Each of protrusions 204 includes a chamfer 210 to ease installation of clutch 200 on input shaft 44. The previously described protrusions may also include similar chamfers.

Another set of chamfers 212 are formed on protrusions 204. Each chamfer 212 may function to entrap fluid between friction surfaces 208 and journal 52. The layer of fluid between drive gear 202 and input shaft 44 may assist in reducing clutch wear while providing a clutch cooling function as well. Once clutch 200 is installed, each protrusion 204 imparts a normal load on journal 52, as previously described in reference to clutch 90. If desired, at least a portion of protrusions 204, including contact surfaces 208, may be formed from a different material from the remainder of clutch 200 to impart desirable PV characteristics to the contact surface.

Figure 10:
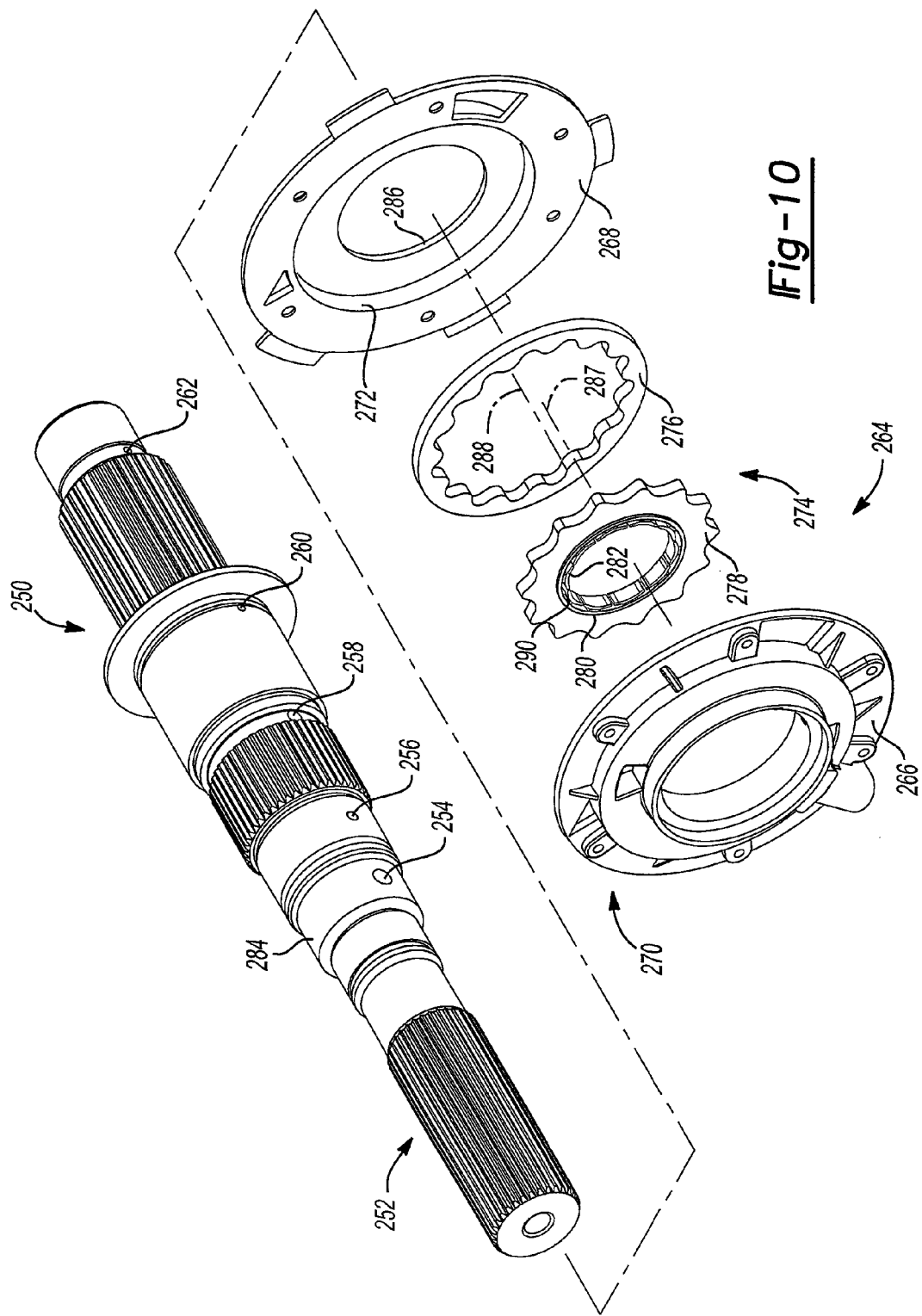
FIG. 10 is an exploded perspective view of a portion of a power transmission device equipped with an alternate clutch and lubrication pump assembly.
Figure 11:
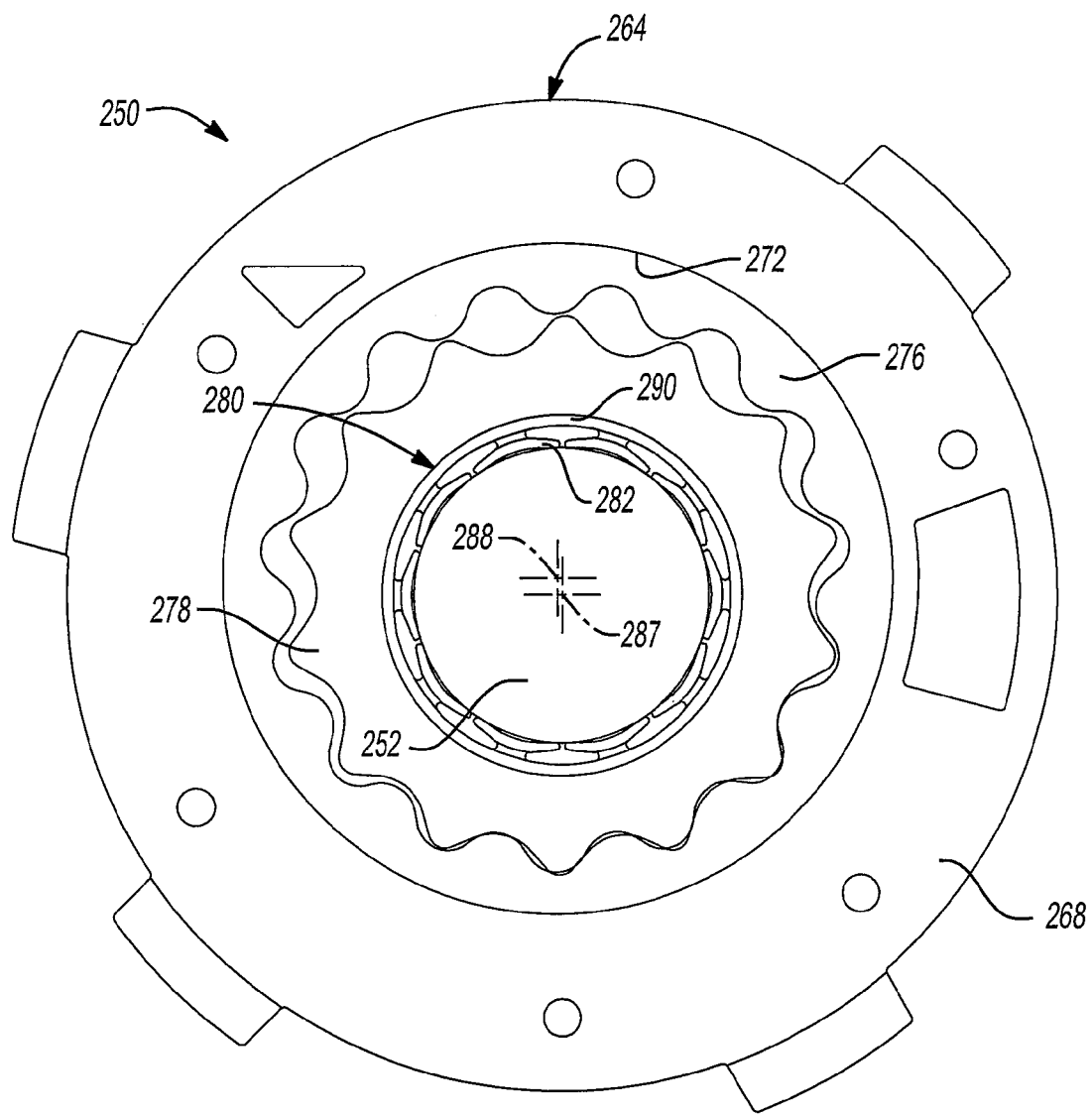
FIG. 11 is a fragmentary plan view of the device shown in FIG. 10.

FIGS. 10 and 11 depict a portion of another power transmission device 250 including a rotatable shaft 252 having an inlet 254 in communication with a plurality of outlet ports 256, 258, 260 and 262 via a central elongated passageway (not shown) substantially similar to passageway 63 previously described. A lubrication pump assembly 264 includes a front cover 266 and a rear cover 268 fixed to one another to form a pump housing 270. A recess 272 is formed in rear cover 268. A gerotor pump 274 includes an outer rotor 276 and an inner rotor 278.

A clutch 280 is fixed to inner rotor 278. Clutch 280 may be formed as any one of the previously described embodiments. Clutch 280 includes a plurality of circumferentially spaced-apart protrusions 282. Each protrusion 282 is placed in biased engagement with a journal 284 formed on shaft 252. Outer rotor 276 and inner rotor 278 are placed in driving engagement with one another within recess 272.

Rear cover 268 includes a through aperture 286. Clutch 280, inner rotor 278, shaft 252 and aperture 286 are aligned along a common axis 287. Recess 272 and outer rotor 276 are aligned with one another along an eccentric axis 288 that extends substantially parallel to and offset from axis 287. One skilled in the art will appreciate that pump assembly 264 is directly driven by shaft 252 and does not include the offset drive gear arrangement previously described. Each of the pump and clutch components including front cover 266, rear cover 268, inner rotor 278, clutch 280 outer rotor 276 circumscribe shaft 252.

In operation, clutch 280 functions in substantially the same manner as the clutches previously described in that protrusions 282 slip relative to journal 284 once a predetermined torque has been transferred. A ring 290 is fixed to protrusions 282 and inner rotor 278. The remaining functions of lubrication pump assembly 264 are substantially similar to those previously described.

It should be appreciated that while the lubrication pump and clutch assembly has been described as acting in cooperation with a transfer case, it is within the scope of the present disclosure that virtually any power transmission device having a need for pumped lubrication fluid may be equipped with the clutch and lubrication pump of the present disclosure. While the drive gear has been shown to be associated with a rotatable input shaft of a power transmission device, the drive gear and radial friction clutch may be positioned in communication with any rotatable shaft of a power transmission device without departing from the scope of the present disclosure. In addition, it is contemplated that power may be provided to the lubrication pump via any number of other devices including belts, chains or another suitable power transmitting element with or without the use of a drive gear.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A power transmission device comprising:
    a rotatable shaft;
    a fluid pump having an inner rotor and an outer rotor in meshed engagement with one another, the outer rotor includes external gear teeth and is rotatable about an axis substantially parallel to a rotary axis of the shaft;
    a clutch for continuously drivingly coupling one of the inner rotor and the outer rotor to the shaft and limiting the power transferred from the shaft to the fluid pump, the clutch including a plurality of circumferentially spaced-apart protrusions biasedly engaged with the shaft; and
    a drive gear in meshed engagement with the external gear teeth of the outer rotor, and wherein the clutch is operably arranged between the drive gear and the shaft.

2. The power transmission device of claim 1 wherein the protrusions includes first and second cantilever beams, each beam having one end in biased engagement with the shaft.

3. The power transmission device of claim 2 wherein the clutch further includes a ring and radially extending webs interconnecting the first and second cantilever beams to the ring.

4. The power transmission device of claim 2 wherein the clutch further includes a weight coupled to the end of the first cantilever beam to reduce the biasing force applied by the first cantilever beam as the rotational speed of the shaft increases.

5. The power transmission device of claim 4 wherein the weight is overmolded within the first cantilever beam.

6. The power transmission device of claim 1 wherein the protrusions are integrally formed with one of the inner rotor and the outer rotor.

7. The power transmission device of claim 1 wherein at least one of the protrusions includes a through slot offset from a distal end of the protrusion to form a flexible web having a friction surface engaging the shaft.

8. A pump and clutch assembly for a power transmission device, the pump and clutch assembly comprising:
    a fluid pump having an inner rotor and an outer rotor in meshed engagement with one another, the outer rotor includes external gear teeth and is rotatable about an axis substantially parallel to a rotary axis of a rotatable driven member of the power transmission device;
    a clutch adapted to drivingly interconnect one of the inner and outer rotors with the rotatable driven member, the clutch including a plurality of circumferentially spaced-apart protrusions adapted to biasedly engage the rotatable driven member to limit the power transferred to the fluid pump; and
    a drive gear in meshed engagement with the external gear teeth of the outer rotor, and wherein the clutch is operably arranged between the drive gear and the rotatable driven member.

9. The pump and clutch assembly of claim 8 wherein the clutch includes a ring integrally formed with and interconnecting the protrusions.

10. The pump and clutch assembly of claim 9 wherein at least one of the protrusions includes first and second cantilever beams.

11. The pump and clutch assembly of claim 10 wherein the clutch further includes a radially extending web interconnecting the first and second cantilever beams to the ring.

12. The pump and clutch assembly of claim 10 further including a weight coupled to the end of the first cantilever beam to reduce the biasing force applied by the first cantilever beam as the rotational speed of the ring increases.

13. The pump and clutch assembly of claim 9 wherein at least one of the protrusions includes a through slot offset from a radially inward end of the protrusion to form a flexible web having a friction surface engaging the shaft.

14. The pump and clutch assembly of claim 9 wherein the rotatable driven member of the power transmission device is a shaft, wherein the ring is fixed to the drive gear such that the clutch is operable for drivingly coupling the drive gear to the shaft.

15. A pump and clutch assembly for a power transmission device, comprising:
    a drive gear adapted to be driven by a rotatable member of the power transmission device;

a fluid pump having a pump housing and a rotary member, the drive gear being rotatably positioned within the pump housing and drivingly engaging the rotary member of the fluid pump to cause a pressurized fluid flow within the rotary member, the rotary member includes external gear teeth and is rotatable about an axis substantially parallel to a rotary axis of the rotatable member;

a clutch including a ring coupled to the drive gear and having a plurality of flexible members adapted to biasedly engage the rotatable member of the power transmission device to transfer up to a predetermined maximum torque to the rotary member of the fluid pump; and the drive gear in meshed engagement with the external gear teeth of the rotary member, and wherein the clutch is operably arranged between the drive gear and the rotatable member.

16. The pump and clutch assembly of claim 15 wherein the flexible members are adapted to remain continuously engaged with the rotatable member of the power transmission device.

17. The pump and clutch assembly of claim 15 wherein the fluid pump is a gerotor pump having an outer rotor driven by the drive gear.

18. The pump and clutch assembly of claim 15 wherein at least one of the flexible members includes a circumferentially extending multi-lever beam.

19. A power transmission device, comprising:
a rotatable shaft;
a drive gear surrounding the shaft; and
a pump and clutch assembly having a fluid pump and a radial friction clutch, the fluid pump having a rotary pump member rotatable about an axis substantially parallel to a rotary axis of the shaft and having external gear teeth in meshed engagement and rotatably driven by the drive gear, wherein the rotary pump member surrounds a pump cavity that generates pressurized fluid, the radial friction clutch disposed between the shaft and the drive gear and including a ring coupled to the drive gear and a plurality of flexible members biasedly engaged with the shaft to limit the torque transferred from the shaft to the pump member.

20. The power transmission of claim 19 wherein the fluid pump includes a pump housing having a first cavity and a second cavity, wherein the drive gear and the friction clutch are operably disposed in the first cavity and the fluid pump is disposed in the second cavity.

21. The power transmission device of claim 19 wherein the fluid pump is a gerotor pump having an inner rotor and an outer rotor in meshed engagement with one another to define the pump cavity, and wherein the outer rotor has the external gear teeth that are meshed with the drive gear.

* * * * *